Nov. 18, 1969  W. G. PAIGE  3,479,118
IMAGE PROJECTION APPARATUS
Filed Nov. 9, 1966  2 Sheets-Sheet 2

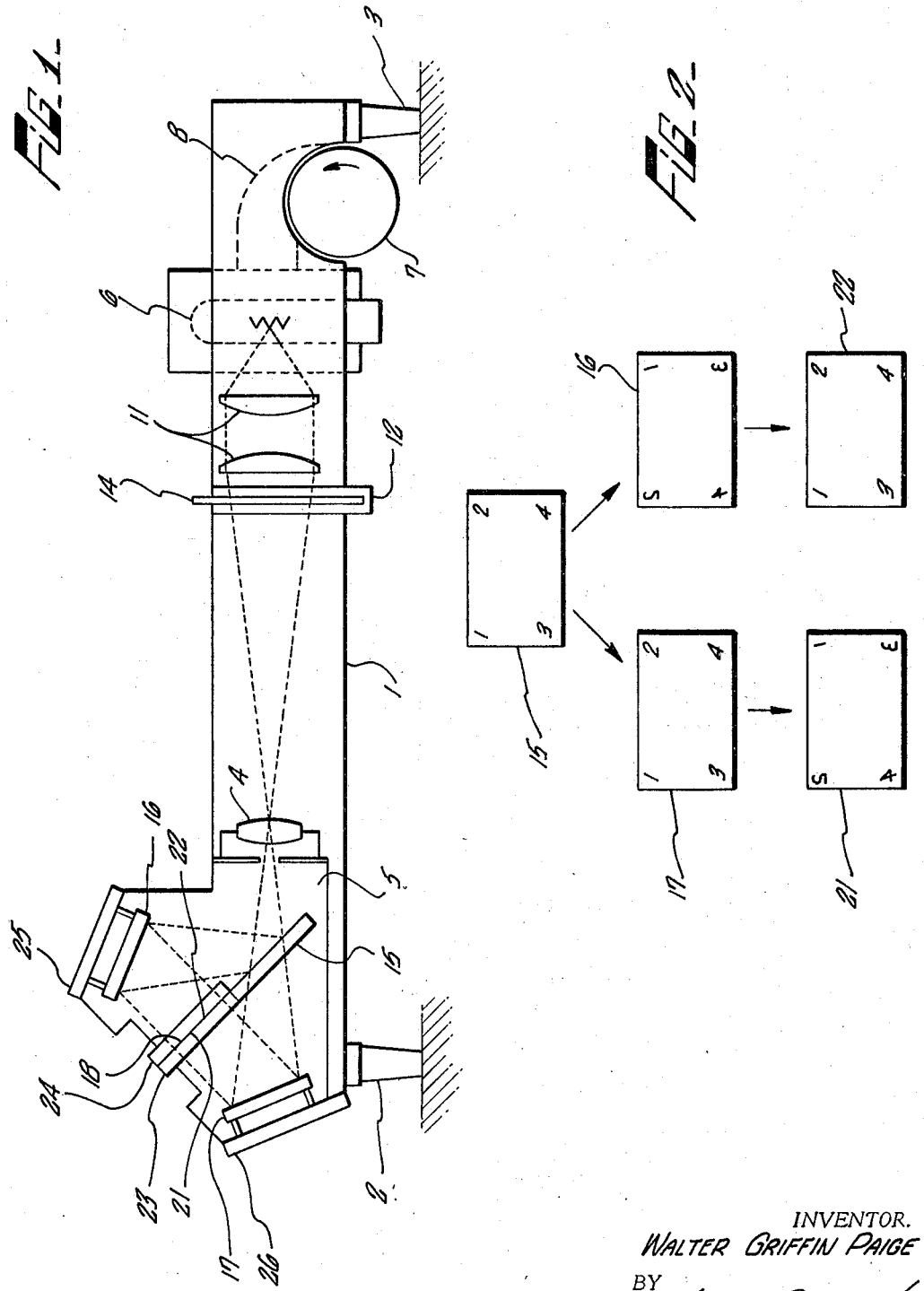

INVENTOR.
WALTER GRIFFIN PAIGE
BY
Christie, Parker + Hale
ATTORNEYS.

3,479,118
IMAGE PROJECTION APPARATUS
Walter Griffin Paige, Pasadena, Calif., assignor to Burroughs Corporation, Detroit, Mich., a corporation of Michigan
Filed Nov. 9, 1966, Ser. No. 593,032
Int. Cl. G03b 27/32, 27/52
U. S. Cl. 355—26         10 Claims

ABSTRACT OF THE DISCLOSURE

An image projection apparatus that splits a single image projecting beam of light into two portions and projects the two portions onto opposite surfaces of a sheet of material in a mirror image relationship. To split the beam, a pellicle is employed having a partially reflective surface. The two portions, after being split, are reflected from adjustable mirrors to the opposite surfaces of the sheet of material. One portion experiences an even number of reflections while the other portion experiences an odd number of reflections. The sheet of material is supported in a holder comprising two parts held together by magnetic force.

---

This invention relates to image projection apparatus and, more particularly, to a system for projecting an image onto one surface of a sheet of material and projecting its mirror image onto the opposite surface of the sheet.

Some image projection systems call for the production of an image and its mirror image on opposite sides of a sheet of material. Notable among these is the process for making metal masks by exposing the surface of a thin metal sheet coated with a photographic emulsion to a beam of light projecting an image corresponding to the pattern of the mask. In this process, a photographic emulsion is employed that hardens on the metallic surface when exposed and is thereafter impervious to acid. After the coated surface is subjected to the light beam, the unexposed emulsion is first washed off, and the metal sheet with the hardened, exposed emulsion protecting areas of its surface is immersed in an acid bath. The acid eats through the unprotected surface of the sheet, leaving a thin mask having a pattern corresponding in size and shape to the exposed areas of the surface of the sheet. Masks produced by the described process are used, for example, to coat surfaces by vacuum deposition.

When only one surface of the metal sheet from which the mask is made is coated with the photographic emulsion and exposed to the image-projecting beam of light, the acid, in eating away the metal around the hardened emulsion, undercuts the pattern formed by the emulsion, which results in deviations from the true dimensions. To minimize this effect, it is common practice to coat opposite sides of the metal sheet with the emulsion, then exposing one side to the image of the pattern and the other side to the mirror image of the pattern. Consequently, the acid works around the edge of the hardened emulsion on both surfaces of the sheet to the same degree. To insure that the deviations from the true dimensions of the pattern are, in fact, minimized by this technique, it is essential that the image projected on the one surface and its mirror image projected on the other surface are the same size and in alignment with one another. These size and alignment requirements have, in the past, been fulfilled only with great difficulty, by expenditure of much time in adjustment, and through use of elaborate and expensive equipment.

According to the invention on the other hand, an image and its mirror image are projected on opposite surfaces of a sheet of material by splitting a single image-projecting beam of light into two portions, one of which is projected on each of the opposite surfaces of the sheet. In traveling to the sheet, the one portion experiences an even number of reflections, while the other portion experiences an odd number of reflections in traveling to the sheet. As a consequence, the two images projected on the opposite surfaces of the sheet bear a mirror image relationship to one another. Since a single image-projecting beam is split to obtain the images on the sheet, adjustment of the relative size and alignment of the images is minimized and only one set of projection equipment, i.e., lamp, condenser, and lens, is required.

Preferably, a pellicle having a partially reflective surface is employed to split the beam. The portion of the beam transmitted through the pellicle is reflected from a mirror directly onto one surface of the sheet, thereby experiencing one reflection. The portion of the beam reflected from the surface of the pellicle is reflected from a mirror directly onto the other surface of the sheet, thereby experiencing two reflections. Thus, the pellicle performs two functions—namely splitting the beam into two portions and reflecting one of the portions.

The mirror in the path of travel of at least one portion of the beam is mounted to permit screw adjustment of its distance from the surface of the sheet and of its angle of inclination. The mirror is thus conveniently adjustable to make the size of the two images identical and to bring them into alignment with one another. Once this is done, the adjustment remains effective until the mirrors are disturbed, even when a different image is projected on the sheet. A feature of the invention provides a special holder to support the sheet while the image is projected onto its surfaces. The holder comprises two plates adapted to accommodate the sheet between their faces. A portion of each plate is cut out to expose the sheet to the impinging beam of light. One or more pairs of pieces of ferromagnetic material are embedded in the adjoining faces of each plate. One piece of each pair is located in one plate directly across from the other piece of the pair in the other plate. At least one piece of each pair is permanently magnetized. Thus, the plates are held together by magnetic force with the sheet supported therebetween.

These and other features of the invention are considered further in the following detailed description taken in conjunction with the drawings, in which:

FIG. 1 is a schematic diagram that represents image projection apparatus illustrating the principles of the invention;

FIG. 2 is a diagram representing the images that are projected on various surfaces of the apparatus of FIG. 1;

Figure 3A:
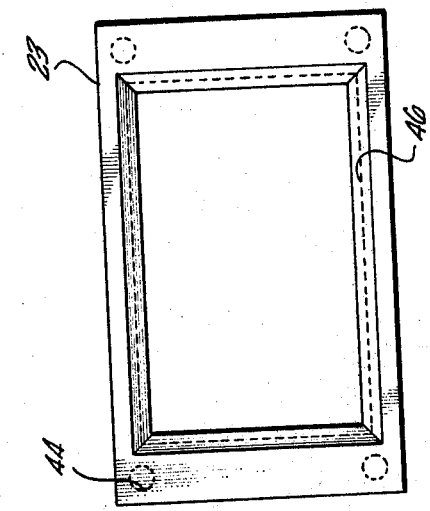
FIGS. 3A and 3B are front and side elevation views, respectively, of a holder for supporting the sheet of material on which an image is projected by the apparatus of FIG. 1.

In FIG. 1 projection apparatus is shown mounted on a support 1. Support 1 rests on four legs such as those designated 2 and 3. A lens 4 is mounted at the aperture of a light-tight compartment 5. To the right of lens 4 are the conventional components found in a set of projection equipment. These include a projection lamp 66, a blower 7, and a duct 8, through which air passes from blower 7 to lamp 6. Light emanating from lamp 6 is collected by a condenser system 11 and directed toward lens 4. Interposed between condenser system 11 and lens 4 is a frame 12 having grooves extending in a direction perpendicular to the direction in which the beam of light developed by condenser system 11 travels. A photographic transparency 14, which bears the image to be projected, fits in the grooves of frame 12 so as to intersect the beam.

Thus, a single image-projecting beam of light passes through lens 4 and into compartment 5. Within compartment 5, a pellicle 15 having a partially reflective surface is located in the path of the image-projecting beam. Pellicle 15 is supported by conventional means not shown in FIG. 1. At the partially reflective surface of pellicle 15, the beam is split (on an energy basis, not on a frequency basis) with about half of the energy being reflected toward a mirror 16 and about half of the energy being transmitted through pellicle 15 toward a mirror 17. Pellicle 15 is sufficiently thin and made of a suitable material to insure that the transmitted portion is not unduly attenuated or the image is not unduly degraded, which depends on the application at hand. The image of transparency 14, as seen from lamp 6, is projected onto the surface of pellicle 15. This image is represented by the block designated 15 in FIG. 2 and having the numbers 1, 2, 3, and 4 in its corners. Also as represented in FIG. 2, the same image (albeit enlarged) is projected onto the surface of mirror 17, and the mirror image of the image appearing on the surface of pellicle 15 is projected onto the surface of mirror 16.

Figure 3B:
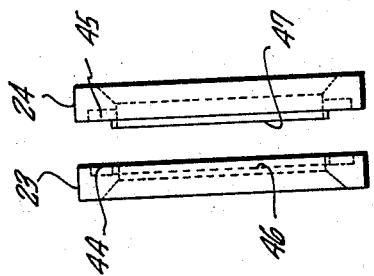

A thin sheet 18 of a material such as metal is supported between plates 23 and 24, which are shown in detail in FIGS. 3A and 3B. Plates 23 and 24 could be held in position by fitting their ends in parallel grooves cut in opposite walls of compartment 5. If projection of the image is done for the purpose of making a mask as described above, the surfaces of sheet 18 would be coated with a photographic emulsion, which upon exposure and development, hardens into an acid-resistive coating. Mirror 16 is located so as to reflect onto a surface 22 of sheet 18 the portion of the image-projecting beam that is reflected from the surface of pellicle 15. Likewise, mirror 17 is located so as to reflect onto a surface 21 of sheet 18 the portion of the image-projecting beam that is transmitted through pellicle 15. As illustrated in FIG. 2, the mirror image of the image projected onto the surface of mirror 17 is in turn projected onto surface 21, and the mirror image of the image projected onto the surface of mirror 16 is in turn projected onto surface 22. Thus, the images projected onto opposite surfaces 21 and 22 of sheet 18 bear a mirror image relationship with one another. Mirrors 16 and 17 are mounted on cover plates 25 and 26, respectively, which form part of the outer walls of compartment 5. These mountings, which are adjustable, are represented schematically in FIG. 1 and shown in detail in FIG. 4.

To make the images projected onto surfaces 21 and 22 of equal size, the distances of travel of both portions of the beam from pellicle 15 to the surface of sheet 18 must be identical. This is achieved by adjusting the spacing between mirror 16 and plate 25 and/or mirror 17 and plate 26. Similarly, the alignment of the images projected onto the opposite surfaces of sheet 18 is achieved by adjusting the inclination or angle of orientation of mirror 16 and/or mirror 17.

In summary, an image and its mirror image are projected onto opposite surfaces of sheet 18 by splitting a single image-prejecting beam of light, projecting the one portion of the split beam onto one surface after reflecting it an even number of times (from pellicle 15 and mirror 16), and projecting the other portion of the split beam onto the other surface after reflecting it an odd number of times (from mirror 17). The difference in the number of reflections of the two portions of the split beam gives rise to the mirror-image relationship between the images projected onto sheet 18.

Figure 4:
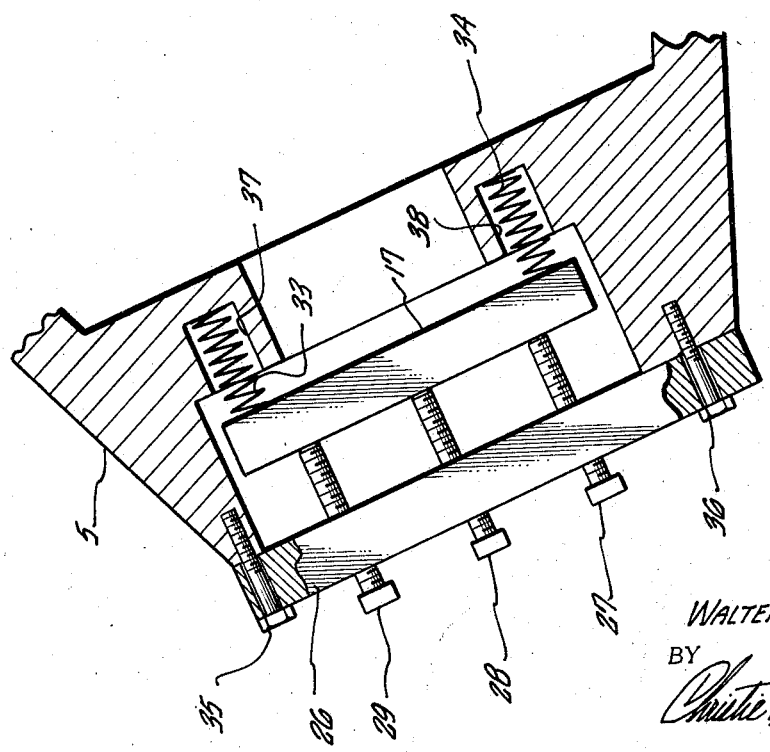
FIG. 4 is a side elevation view of the arrangement for mounting the mirrors to permit their screw adjustment.

Reference is now made to FIG. 4, in which the details of the adjustable mounting for mirror 17 are shown. The mounting for mirror 16 could also be identical to that shown in FIG. 4. Plate 26 is fixed to the wall of compartment 5 by a plurality of screws such as those designated 35 and 36. The wall on the inside of compartment 5 has protrusions in which four counterbores are formed, such as those designated 37 and 38. A compression spring, spring 33 in the case of bore 37 and spring 34 in the case of bore 38, is seated in each counterbore and extends therefrom to the surface of mirror 17 to which it is attached. Screws 27, 28, and 29 extend through threaded openings in plate 26. The compression springs urge mirror 17 into contact with the ends of screws 27, 28, and 29. To adjust the position of mirror 17, screws 27, 28, and 29 are turned. The size of the image projected onto sheet 18 is changed by adjusting all the screws the same amount, thereby causing mirror 17 to move in a direction perpendicular to its surface. To change the lateral position of the image projected onto surface 21 of sheet 18 for the purpose of aligning it with the image projected onto surface 22 of sheet 18, the screws are individually adjusted, thereby changing the inclination of mirror 17.

FIGS. 3A and 3B show in detail plates 23 and 24, which have openings through them to expose the surfaces of sheet 18 to the image-projecting beam of light. Plate 23 has an indentation 46 into which sheet 18 is placed, and plate 24 has a protrusion 47 which also fits into indentation 46. Pieces of magnetic material are embedded in adjacent surfaces of plates 23 and 24. The pieces of magnetic material are arranged in pairs, such as 44 and 45, located directly opposite from one another in their respective plates. At least one of each pair is permanently magnetized. The pairs of pieces of magnetic material serve to hold plates 23 and 24 firmly against sheet 18. This holder is particularly advantageous to support sheets of varying thickness. The sheet is firmly clamped between the adjacent surfaces of plates 23 and 24 by magnetic force, even though the plate surfaces may be held in spaced relationship because of the thickness of the sheet.

What is claimed is:

1. An image projection system comprising: a source of an image-projecting beam of light; a body having opposite, substantially parallel surfaces on which an image and its mirror image are to be projected; means for splitting the beam into first and second portions; means, in projecting the image onto one of the opposite surfaces, for reflecting the first portion of the beam an even number of times; means, in projecting the mirror image onto the other of the opposite surfaces, for reflecting the second portion an odd number of times; and means for adjusting the relative sizes of the images projected onto the opposite surfaces.

2. An image projection system comprising: a source of an image projecting beam of light; a body having opposite, substantially parallel surfaces on which an image and its mirror image are to be projected; means for splitting the beam into first and second portions; means, in projecting the image onto one of the opposite surfaces, for reflecting the first portion of the beam an even number of times; means, in projecting the mirror image onto the other of the opposite surfaces, for reflecting the second portion an odd number of times; and means for aligning the images projected onto the opposite surfaces.

3. An image projection system comprising a source from which a single image-projecting beam of light emanates, a sheet of material having first and second opposite surfaces, means interposed in the path of the image-projecting beam for reflecting a first portion of the beam and transmitting a second portion of the beam, means interposed in the path of the transmitted portion for directly reflecting the transmitted portion onto the first surface of the sheet, and means interposed in the path of the reflected portion for directly reflecting the reflected portion onto the second surface of the sheet.

4. The image projection system of claim 3, in which the means for reflecting a first portion of the beam and transmitting a second portion of the beam is a pellicle having a partially reflective surface.

5. The image projection system of claim 3, in which the means for reflecting the transmitted portion and the means for reflecting the reflected portion are plane mirrors.

6. The image projection system of claim 5, in which the position of at least one of the mirrors is adjustable in a direction perpendicular to its reflective surface.

7. The image projection system of claim 5, in which the inclination of at least one of the mirrors is adjustable so as to permit alignment of the images.

8. The image projection system of claim 5, in which a fixed support and three spacers are provided for at least one of the mirrors to hold it in spaced relationship to the support, the spacers being separably adjustable in length to change the spaced relationship between the support and the mirror.

9. The image projection system of claim 5, in which a cover plate is provided having three threaded openings through which three spacer screws pass, and a plurality of springs are provided to urge one of the mirrors against the ends of the three spacer screws.

10. The image projection system of claim 5, in which the sheet is supported between two plates having holes through them to permit exposure of an area of the sheet to the light beam, the plates being held together by pieces of magnetic material embedded in the adjacent surfaces of the plates in opposite relationship, at least one piece of the magnetic material being permanently magnetized.

References Cited

UNITED STATES PATENTS 1,802,530   4/1931   Pilny et al. _____ 88—24

NORTON ANSHER, Primary Examiner

R. A. WINTERCORN, Assistant Examiner

U.S. Cl. X.R.

350—297